H. C. LORD.
TARGET TRAP.
APPLICATION FILED MAY 10, 1907.

956,117.

Patented Apr. 26, 1910.
5 SHEETS—SHEET 1.

Fig. 1.

Witnesses
Bessie F. Parker,
E. S. Roach

Inventor
Hugh C. Lord

UNITED STATES PATENT OFFICE.

HUGH C. LORD, OF ERIE, PENNSYLVANIA.

TARGET-TRAP.

956,117.     Specification of Letters Patent.    Patented Apr. 26, 1910.

Application filed May 10, 1907. Serial No. 372,860.

*To all whom it may concern:*

Be it known that I, HUGH C. LORD, a citizen of the United States, residing at Erie, in the county of Erie and State of Pennsylvania, have invented new and useful Improvements in Target-Traps, of which the following is a specification.

This invention relates to target traps and consists in certain improvements in the construction thereof as will be hereinafter fully described and pointed out in the claims.

The invention is illustrated in the accompanying drawings as follows.

Figure 1:
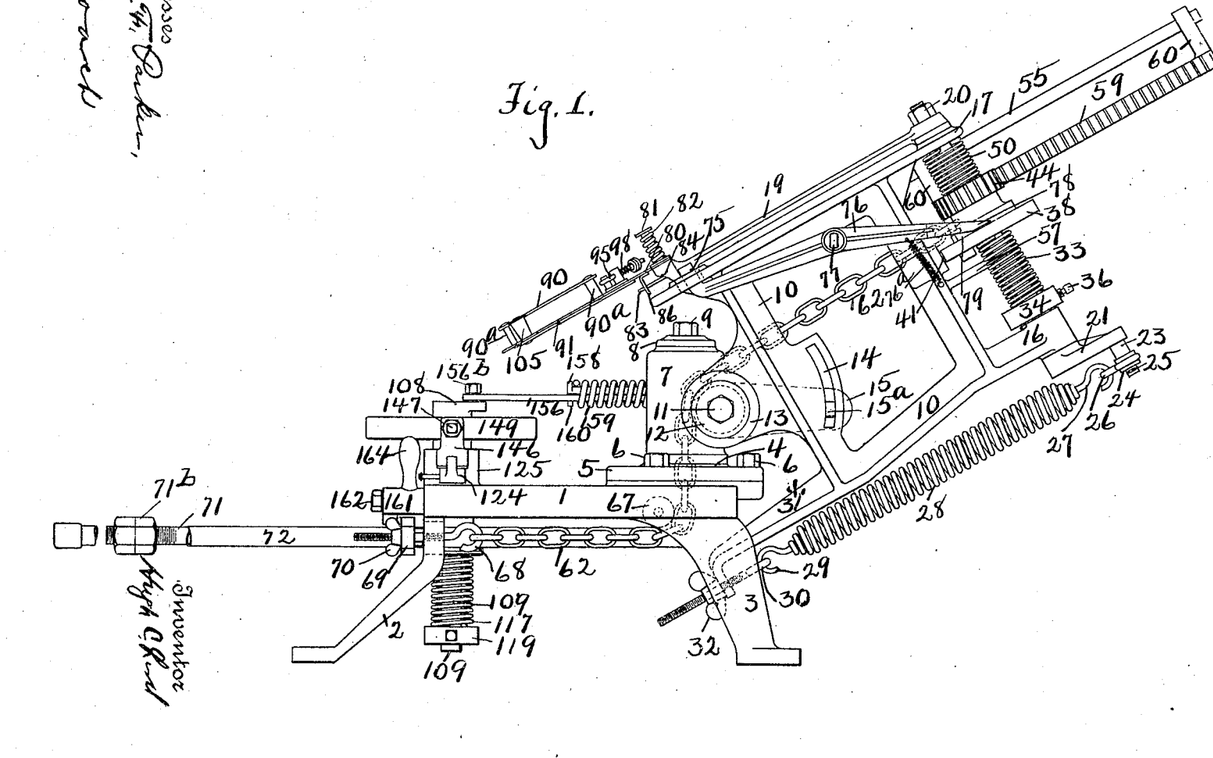
Figure 1 shows a side elevation of the trap.

1 marks the base. It is supported by a rear leg 2 and two front legs 3. A post 4 has a flange 5 which is secured to the base by the screws 6. A sleeve 7 is swiveled on this post. It is held in place by the washer 8 and screw 9, the screw 9 extending into the post 4. A frame 10 is pivotally secured on the sleeve 7 by means of the screw 11. The screw 11 operates on the washer 12 and the washer extends into a socket 13 in the frame 10. A curved slot 14 is arranged in the frame, the curve having a center at the center of the pivot of the frame. A finger 15 extends outwardly from the sleeve 7, and a bolt 15ª extends through the slot into this finger. This bolt 15ª together with the clamping effect of the screw 11 permits the adjusting of the frame 10 to any desired elevation. Two arms 16 and 17 extend from the front end of the frame in which are arranged the bearings for the shaft 18. The throw arm 19 is secured to the shaft 18 in any desired manner, preferably by the squared end on the shaft and the squared socket on the arm. A nut 20 is screwed onto the end of the shaft, locking the arm in place. A crank arm 21 is secured to the lower end of the shaft by means of a pin 22. A crank pin 23 is secured to this crank arm and a bearing sleeve 24 is secured on this pin by means of a cotter pin 25. An eye 26 is secured to the sleeve and the eye bolt 27 hooks onto the eye 26. The eye bolt 27 is secured to the one end of an extension spring 28. An eye bolt 29 is arranged on the opposite end of the spring 28 from the bolt 27 and is secured to an eye bolt 30. The eye bolt 30 extends through a projection 31 on the frame and is adjustably secured thereto by means of a thumb nut 32. The crank is so arranged relatively to the arm that when the arm is in set position as shown in Fig. 1, the spring 28 is fully extended, the crank being preferably on center. A torsion spring 33 is secured to a collar 34 by means of a screw 35. The collar is adjustably secured to the shaft 18 by means of a set screw 36. The upper end of the spring 33 is secured to a ratchet plate 38 by means of a screw 39. A distance sleeve 37 is arranged on the shaft 18 within the spring 33.

In the operation of the trap, the throw arm 19 is designed to make a complete rotation. With the initial movement of the throw arm, that is that part of its travel which is utilized for throwing the target, the spring 28 acting through the crank on the end of the shaft 18 forces the throw arm forward to throw the target. As soon as the arm reaches a point diametrically opposite from its set position the crank has made a half revolution so that any further movement of the arm is opposed by the spring 28. The spring, in the half revolution which it has exerted pressure on the arm has delivered sufficient pressure to the arm, barring frictional losses and the energy which is absorbed by the target, to return the arm. Ordinarily the momentum of the arm is sufficient to carry it by the center about ninety degrees, or in other words, to bring it about half way back to its set position. In the trap forming the subject of this invention, this momentum is utilized, as is also the resisting force of the spring 28. The torsion spring 33 has just sufficient strength to return the arm to set position, utilizing the momentum given to the arm. Theoretically the energy of this spring represents the frictional losses and the work done on the target. It will be noted that this spring 33 acts with the spring 28 during the first half revolution of the arm, and that the spring 28 acts against the torsion spring during the remaining half revolution. By balancing these springs the arm may be brought to its set position with comparatively little shock and at the same time it is forced through the complete circle at a high rate of speed and without pause so that the trap is reset with the greatest possible speed. This is important in that in this type of trap, the time allowed for feeding the target is very short, and of course the more rapidly the trap may be reset, the more time is allowed for this purpose.

Figure 5:
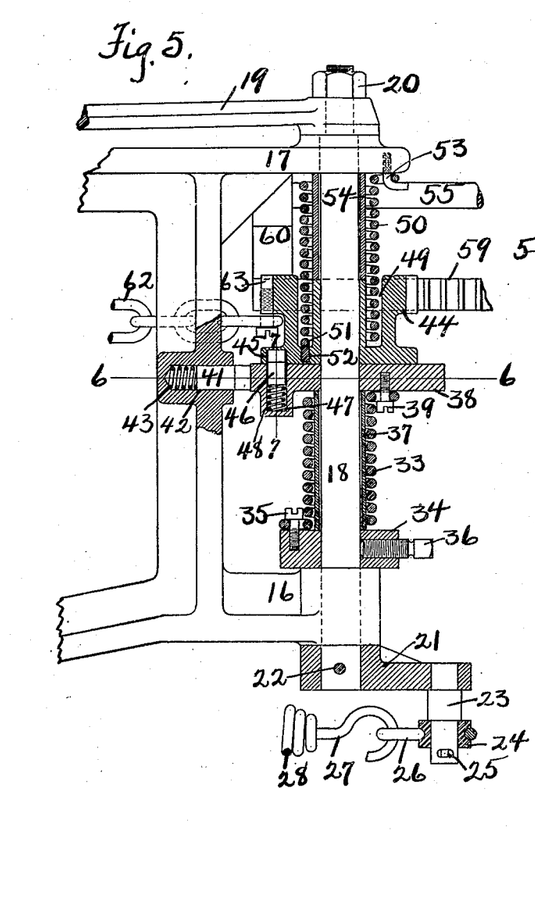
Fig. 5 an enlarged section through the mechanism directly connected with the throwing arm, the section being on the line 5—5 in Fig. 6.
Figure 6:
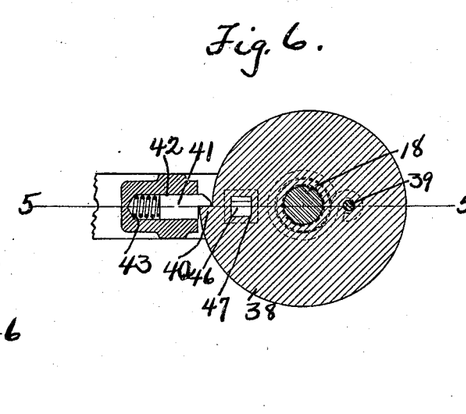
Fig. 6, section on the line 6—6 in Fig. 5.
Figure 7:
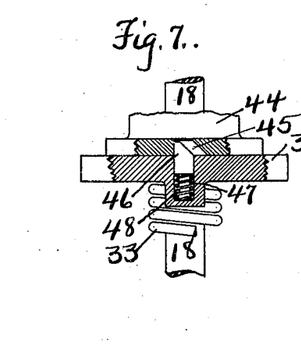
Fig. 7, a section on the line 7—7 in Fig. 5.

It will be noted that with each revolution of the arm the torsion spring is unwound one revolution and all that is necessary to keep the trap in operation is to rewind the spring 33 one revolution with each operation of the trap. This is accomplished by the following mechanism: The ratchet plate 38 loosely mounted on the shaft 18 has a ratchet tooth 40 upon it which engages a ratchet pawl 41. The ratchet pawl 41 is arranged in a socket 42 in the frame and is forced into engagement by a spring 43. As the ratchet plate is rotated one revolution, it is caught and held by this ratchet mechanism. The spring 33 is of course wound up one revolution with each revolution of the ratchet plate. A gear wheel 44 is journaled on the shaft 18, directly above the ratchet plate. It has a ratchet socket 45 in its under surface. A ratchet pawl 46 operates in this socket. The ratchet pawl 46 is arranged in a socket 47 on the ratchet plate 38. It is forced into engagement by a spring 48 arranged in the bottom of the socket. The gear 44 is provided with an annular socket 49. A spring 50 extends into this socket. The end of the spring has a downward bend 51 which extends into a hole 52 in the bottom of the annular groove so as to lock the spring in the gear. The upper end of the spring is secured to the hook 53 on the frame. The purpose of this spring is to return the gear after it has been rotated a revolution. A guide rod 55 is secured to the ear 56 extending from the frame and to the arm 57 extending from the frame. A set screw 58 is preferably arranged in the ear 56 for locking the rod in place. A rack 59 has the perforated ears 60 at each end and these ears are slidingly mounted on the rod 55. The ears are of such length and the rod so placed as to position the rack relatively to the pinion 44. The rack is held in engagement with the bearing surface 61 for this purpose. A chain 62 is secured to the rack by means of a screw 63. This chain runs over a pulley 64. The pulley is mounted between the ears 65 and 66 extending from the sleeve 7. The pulley leads the chain into the post 4 which is formed hollow so as to permit the chain to run through it. The front face of the post is also cut out for this purpose. The chain extends down through the post and under a pulley 67. An eye bolt 68 is secured in the end of the chain and passes through a cross piece 69. A thumb nut 70 is arranged on the eye bolt for adjustably securing it to the cross piece 69. A guide rod 71 extends through perforations in the base, the front end being preferably screwed into one perforation and secured by a jam nut 71$^a$. The cross piece 69 is secured to the pull rod 72 by means of a pin 72$^a$. The front end of the pull rod is preferably screwed into a cross piece 74$^a$ extending from the rack 74, the rack connecting the cross piece 69 with the cross piece 74$^a$. A latch 75 extends through a socket 75$^a$ in the frame. This is carried by a rocking arm 76 pivoted on the frame by means of a screw 77. The end 78 of the arm extends into the path of a cam 79 on the ratchet plate 38. This cam is in such position as to force the end 78 of the arm upwardly with initial movement of the ratchet plate, and this upward movement of the end 78 throws down the latch 75 and releases the arm.

*Operation of the throwing mechanism.*— The rod 72 may be operated by any lever mechanism desired. (Not shown.) As the rod 72 is pulled to the rear, it acting through the chain pulls the rack 59 to the rear, and the rack 59 turns the gear 44. The gear 44 is locked by the rachet mechanism with the ratchet plate 38 so that the plate 38 is turned with the gear. With the initial movement of the pull, therefore, the ratchet plate is turned and the cam 79 trips the latch and releases the arm. As the pulling movement is continued, it carries the cam 79 beyond a position to affect the arm 76 so that the arm 76 and latch 75 acting under the influence of spring 76$^a$, return to their normal position in the path of the arm. The pull continues until the rack has turned the gear one full revolution, preferably slightly more than a revolution so as to give the ratchet pawl 41 time to engage. By this movement the torsion spring 33 is wound up one revolution. The throw arm continues without pause throughout the entire circle and is arrested by the latch at its set position. The torsion spring is preferably so tensioned that it requires some additional winding after the tripping of the throw arm to give it sufficient strength to bring the arm around to set position. Otherwise the arm would be subjected to greater shock than is desirable. The spring mechanism may be adjusted for this purpose by turning the collar 34, the set screw 36 permitting it to be adjusted in any position desired. On the forward movement of the pull rod 72, the spring 50 acting on the gear 44 draws the rack and chain forward. The movement of the rack is sufficient to permit the gear to return the full revolution so as to relock the ratchet pawl 46 in the ratchet socket 45 for a succeeding operation.

Figures 8, 9, 10, 11:
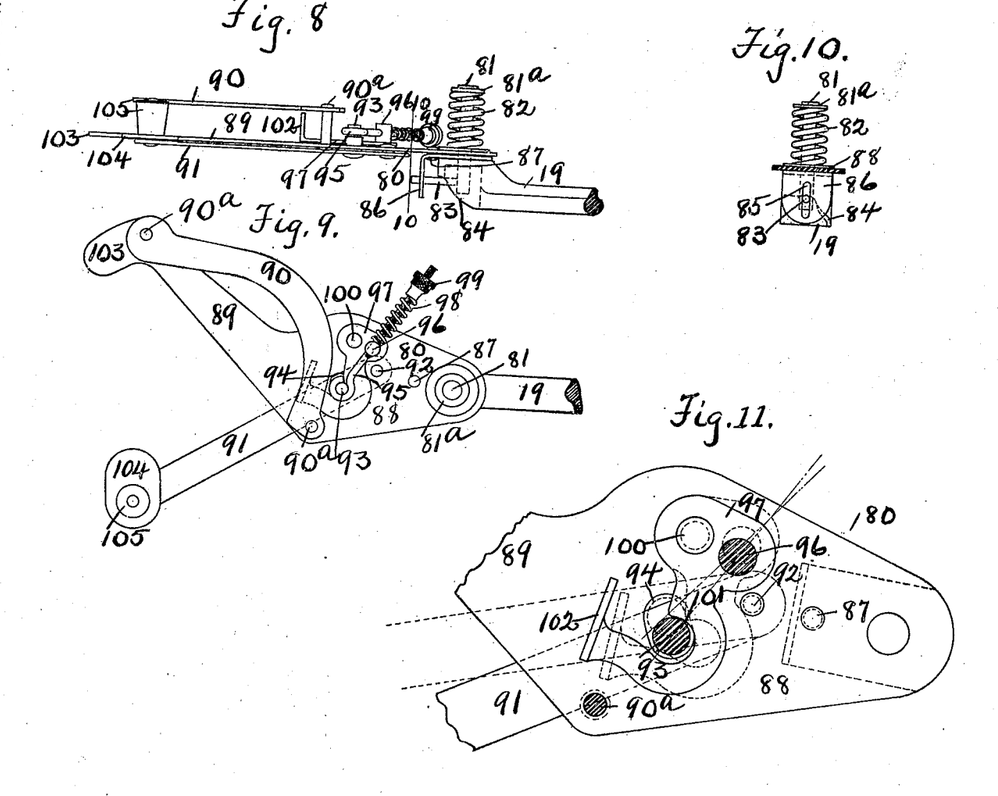
Fig. 8, a side elevation of the carrier.
Fig. 9, a plan view of the carrier.
Fig. 10, a section on the line 10—10 in Fig. 8.
Fig. 11 an enlarged view of the self opening mechanism.

*Carrier-positioning device.*—The carrier 80 is preferably pivotally secured to the end of the throw arm. This is accomplished in the present instance by a pin 81 extending through the carrier and throw arm. A spring 82 is arranged between the head 81$^a$ and the plate 88 on the carrier. A pin 83 extends through the pin 81 and locks the pin on the arm. The pin 83 is arranged to operate upon an annular cam on the end of the arm. This cam is such that as the pin turns on the cam, the pin 81 is forced down and the spring 82 is compressed. The pin extends through a slot 85 in a plate 86. The plate 86 is secured to the carrier by means of a rivet 87. This is preferably in the form shown having the rearwardly bent extension through which the pin 81 extends and a downwardly extending lip in which the slot 85 is arranged.

As the trap is operated and the arm is arrested by the latch 75, the momentum of the carrier forces it forward and this carries with it the pin 83. As the pin 83 swings it rides on the cam 84 thus pulling down the pin 81 and compresses the spring 82. As soon as the forward swinging of the carrier is arrested through this retarding mechanism the pin acting on the cam and under the influence of the spring 82 returns the carrier to a position in line with the arm, thus the cam arrangement buffers the sweep of the carrier and so relieves the shock and also positions the carrier by returning it. As the carrier is returned it is grasped by the trapper and the target fed into the carrier. The end of the arm opposite the cam 84 is preferably left substantially flat so that very little resistance is offered to the swinging of the carrier toward the rear. This is desirable in that any added swing of the carrier to the rear increases the rotative effect that it gives to the target. The shape of the end of the arm, however, may be so varied as to position the carrier as desired.

*Carrier.*—The carrier has the arm or finger 89 extending forward from the main carrier plate and a rail 90 is supported above this arm by means of the posts 90$^a$. A swinging finger 91 is secured to the plate 88 by means of a pin 92. A pin 93 extends upwardly from the finger 91 through a slot 94 in the plate 88. A rod 95 is secured to the pin and extends through a post 96. The post 96 is pivotally secured to a bell crank lever 97. A spring 98 is threaded onto the rod 95 and the nut 99 is screwed onto the rod so as to adjust the tension on the spring. The bell crank lever 97 is secured by a pin 100 on the plate 88. It has a catch 101 the engaging edge of which forms a cam surface which is adapted to engage the pin 93 so as to lock the finger 91 in the open position. The bell crank lever also has the forwardly extending finger 102 which when the catch is in its forward position is in position to be engaged by the target as it is thrust into the carrier. As the target moves the catch back, it reaches the position shown in dotted lines in Fig. 11. It will be noted that the catch finger 102, or at least that part of it which is engaged by the target is in a line extending from the pin 81 forming the pivot of the carrier outwardly and centrally between the post 105 and the end of the fixed jaw. As a result of this a pressure by the target directly in the line of the pivot will trip the catch. This is desirable in that the pressure exerted by the carrier to trip the catch does not tend to swing the carrier, so as to interfere with the operation. A projection 103 is arranged on the end of the finger 89 and an inward projection 104 is arranged on the end of the finger 91 adjacent to the rubber post 105. These projections 103 and 104 extend inwardly far enough to support the edges of the target with the finger 91 in its open position. As soon as the catch is moved out of engagement through the action of the target, the finger 91 springs inwardly so that the post 105 engages and holds the target. By arranging the bell crank lever on the plate and having the cam portion of the catch engage the pin 93, the bell crank lever swinging as the catch is thrown out, it carries the pin 96 a somewhat greater distance than the pin 93 moves. They move, however, somewhat in harmony so that the spring 98 is relieved of some of the action incident to the movement of the catch. This arrangement also brings the finger 102 directly to the rear of the carrier so that the natural thrust of the target is directly against the catch.

Figure 12:
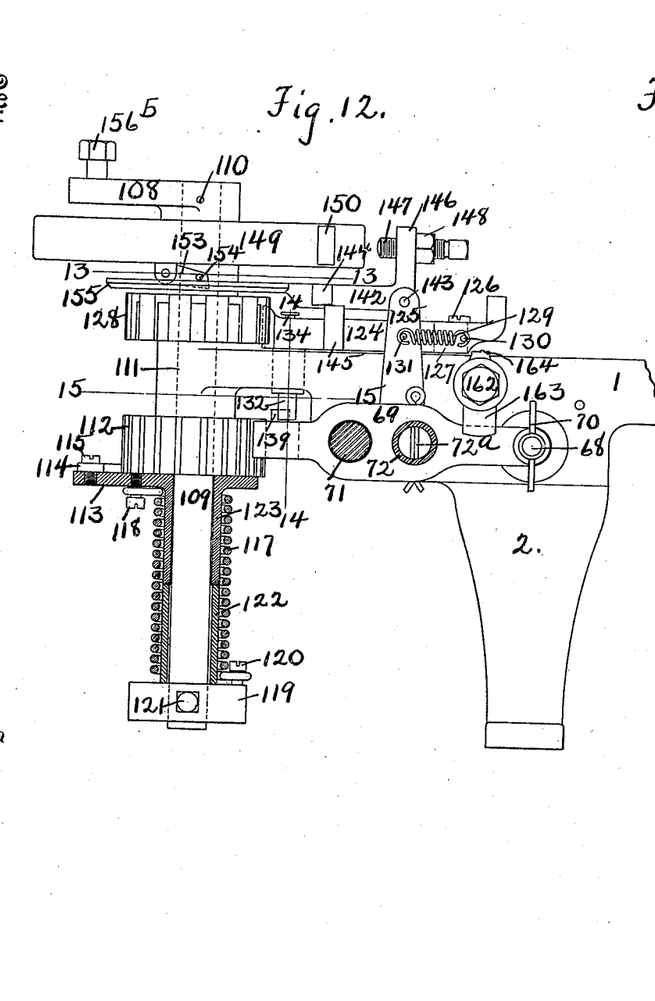
Fig. 12 an enlarged view of the unknown angle mechanism, the view being principally an elevation from the rear of the trap and partly in section.
Figure 13:
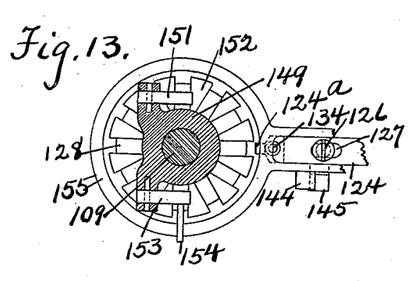
Fig. 13, a section on the line 13—13 in Fig. 12.
Figures 14, 15:
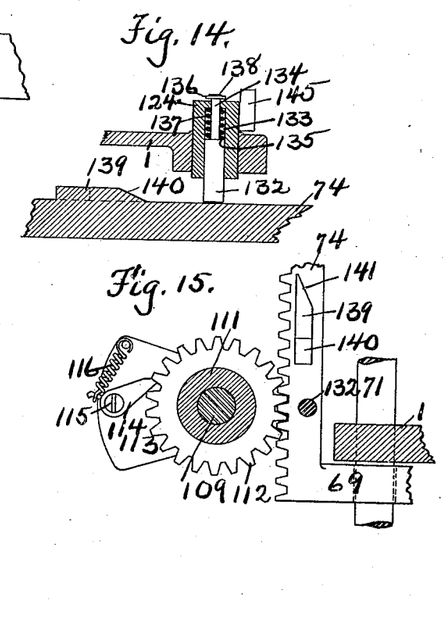
Fig. 14, a section on the line 14—14 in Fig. 12.
Fig. 15, a section on the line 15—15 in Fig. 12.

*Unknown angle mechanism.*—An arm 106 extends outwardly from the sleeve 7 and is connected by a link 107 with a crank 108. The crank is secured on the shaft 109 by a pin 110. The shaft 109 extends through a bearing 111 arranged on the base of the trap. A gear 112 is journaled on the shaft 109 in position to be in mesh with the rack 74 and is oscillated as this rack is reciprocated in the pulling of the trap. A ratchet plate 113 is journaled on the shaft 109 immediately below the gear 112. The pawl 114 on this plate is pivoted on the screw 115 and extends into position to act upon the gear 112. This is thrown against the gear by the spring 116. The torsion spring 117 is arranged around the shaft 109 and secured to the ratchet plate 113 by the screw 118. The opposite end of the spring is secured to a collar 119 by means of a screw 120. The collar 119 is secured to the shaft 109 by a set screw 121. A distance piece 122 extends from the collar 121 to the hub 123 of the plate 113. The catch slide 124 is mounted on the base of the trap between the ears 125. This is secured in place by the screw 126 extending through the slot 127. It has a catch point 124ª which is in position to engage a notched wheel 128. The wheel 128 is fixed on the shaft 109. A spring 129 extends from a pin 130 on the slide 124 to a pin 131 on the ear 125 and tends to force the slide into engagement with the notched wheel as shown in Fig. 12. The slide has a downwardly extending projection which extends through a slot in the base of the trap. A pin 132 is arranged in a socket 133 in this projection. The pin has the reduced end 134 forming a shoulder 135. The socket 133 does not in its full diameter extend entirely through the slide but forms a shoulder 136. A spring 137 is arranged between the shoulder 135 and 136 and exerts pressure downwardly on the pin 132. A head 138 is arranged on the upper end of the pin 132 and prevents its withdrawal from the socket. The pin is in the path of a cam lug 139 on the rack 74. This cam lug has two cam surfaces 140 and 141. The cam surface 141 extends the full width of the cam and is so arranged as to simply lift the pin 134 as the rack is drawn toward the rear. The cam 141 engages the pin 132 and forces it with the slide 124 sidewise as the rack is moved in a forward direction. This movement is sufficient to throw the catch 124ª out of engagement with the notched wheel. A trip lever 142 is pivoted on a pin 143 extending between the ears 125. It has a trip block 144 which drops down in front of a trip block 145 on the slide 124 when the slide 124 is moved out through the action of the cam 141 so that the slide is locked out in this manner. An arm 146 extends upwardly from the lever 142 and a screw 147 extends through this arm and is locked in position by a nut 148. A chance wheel 149 is journaled on the shaft 109. It has a projection 150 which is adapted to engage the screw 147 and through its action upon the arm 146 and lever 142 to lift the trip 144 out of engagement with the trip lock 145 to permit the slide to move forward and lock the notched wheel. A ratchet pawl 151 is secured to the under side of the chance wheel 149 in position to engage the projections 152 on the top of the notched wheel 128.

Figure 3:
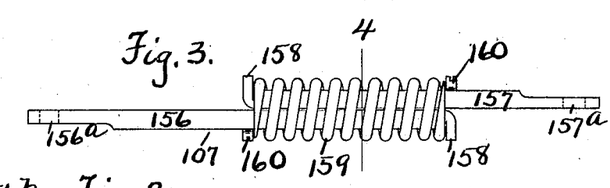
Fig. 3 a side elevation of the link connecting the unknown angle driving mechanism with the oscillating frame.
Figure 4:
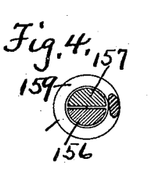
Fig. 4 a section on the line 4—4 in Fig. 3.

*Operation.*—In the operation of the unknown angle mechanism, the shaft is affected on the forward stroke of the lever. As the rack is drawn back it turns the gear 112 but the gear simply turns on the shaft 109. On the return stroke, however, the ratchet pawl 114 engages the gear 112 so that the ratchet plate 113 is turned with the gear. During the forward movement also of the rack the cam 141 engages the pin 132 and forces the slide 124 out of locking position with reference to the notched wheel 128. The slide is locked in this outward position by means of the trip lug 144 on the trip lever 142. The forward movement of the rack is ordinarily very rapid, in fact much more rapid than would be practical to shift the oscillating frame. The forward movement, therefore, simply winds up the spring 117 and unlocks the notched wheel. The shaft acting under the influence of the spring 117 turns and as it turns it carries with it the crank 108 and shifts the angle of the trap. It also turns with it, through the action of the pawl 151 on the notched wheel, the chance wheel 149. These parts all move together until the projection 150 on the chance wheel engages the screw 147. When this happens the trip lever 142 is raised so as to unlock the slide 124. The slide acting under the influence of the spring 129 immediately moves forward and the catch 124ª moves into a notch in the notched wheel and locks the trap in this position. The spring 117 is wound up sufficiently to give the crank a complete rotation. Of course a greater or less amount of this may be used, depending on the initial position of the projection 150. After the projection 150 has acted on the screw 147 so as to lock the shaft 109, the chance wheel 149 continues to rotate under its inertia until it comes to rest. The position of the projection 150 when the chance wheel comes to rest determines the amount of movement of the oscillating frame with the next operation of the trap. As the crank passes by the centers the inertia of the oscillating frame is such as to so retard the movement of the crank that the chance wheel would ordinarily over run the crank and thus prematurely act upon the trip lever. To obviate this I have provided the second pawl 153 which is secured to the under side of the chance wheel. This pawl is opposed to the pawl 151 and prevents the over running of the chance wheel. In order to permit the chance wheel to continue running after the lever 142 is tripped, I provide the pawl 153 with the outwardly extending pin 154 which extends over a ring 155. The ring 155 is formed on the end of the trip lever 142 so that as the trip lever is raised to unlock the slide this ring is also raised and acting on the pin 154 lifts the pawl 153 out of the path of the projections on the notched wheel. It is also desirable to buffer the jar or shock incident to the shifting of the direction of the movement of the oscillating frame and also incident to the locking in of the slide 124. To accomplish this I have made the link 107 in the form of a buffer link. It comprises the two semi-circular rods 156 and 157. These have the perforations 156$^a$ and 157$^a$ through which the pin 156$^b$ extends into the crank and the pin 157$^b$ into the arm 106. The ends 158 of the half round pieces 156 and 157 are bent outwardly. A coil spring 159 is arranged around the semi-circular rods and after being put under tension by drawing them in opposite directions with the ends 158 against the spring the pins or screws 160 are secured to the rods in position to engage the spring. It will be observed therefore that the spring is compressed either when the ends of the rods are moved toward each other or from each other. The pull on the spring in each instance is only on one side. The tendency is to cock the spring so as to bind the two surfaces of the half rounds and this adds a frictional element to the buffer and increases its efficiency.

Figure 2:
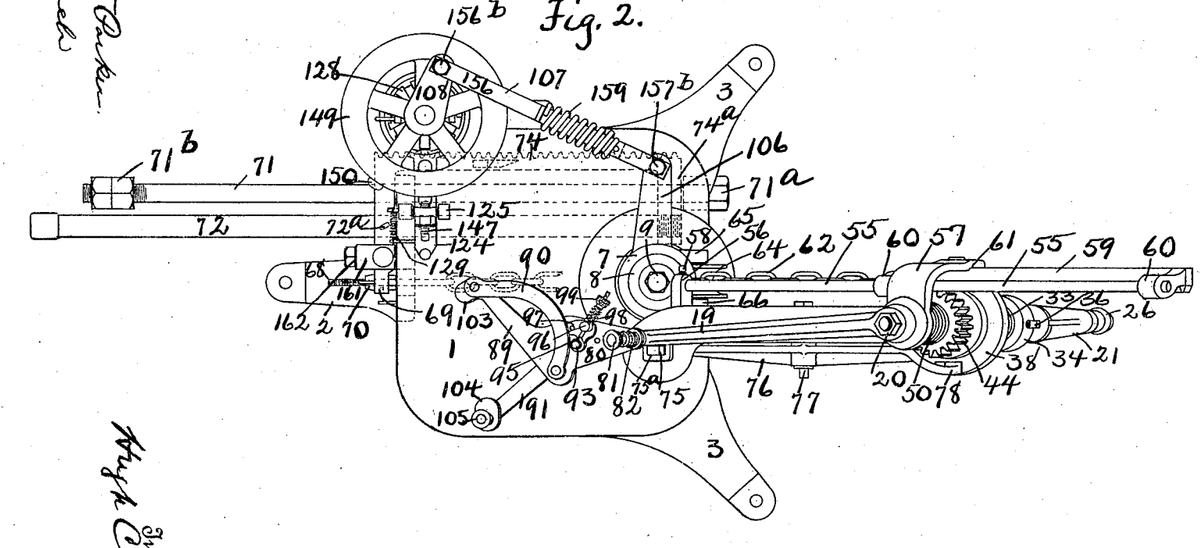
Fig. 2 a plan view of the trap.

It will be noted that the throw of the pull rod 72 should be sufficient to give the gear 44 one complete rotation with a little margin. This throw can be adjusted by means of the nuts 71$^b$ on the rod 71. The cross piece 69 engages these nuts. I prefer also to provide a safety device so that the pulling of the trap may be prevented by the trapper when desired. I secure the lever 161 to the base by means of the screw 162. This lever has the lug 163 which can be thrown in front of the cross piece 69 when desired and the handle 164 is arranged for conveniently operating the lever.

What I claim as new is:

1. In a target trap the combination of a throw arm; a crank associated with the throw arm; a spring acting on the crank for exerting driving pressure on the throw arm during its throwing movement; means acting on the arm and against said spring after the crank passes the center for driving the arm with a continuous movement in continuation of the throwing movement to a position putting said spring under approximately maximum tension.

2. In a target trap the combination of a throw arm; a crank associated with the throw arm; a spring acting on the crank for exerting driving pressure on the throw arm during its throwing movement; and means acting on the arm and against said spring after the crank passes the center for driving the arm with a continuous movement in continuation of the throwing movement to a position from set position to set position.

3. In a target trap the combination of a throw arm; a crank associated with the throw arm; a spring acting on the crank for exerting driving pressure on the throw arm during its throwing movement; and an auxiliary spring acting on the arm and against said spring after the crank passes the center for driving the arm with a continuous movement in continuation of the throwing movement to a position putting said spring under approximately maximum tension.

4. In a target trap the combination of a throw arm; a crank associated with the throw arm; a spring acting on the crank for exerting driving pressure on the crank during the throwing movement; and pull operated means acting on the arm and against said spring after the crank passes the center for driving the arm with a continuous movement in continuation of the throwing movement to a position putting said spring under approximately maximum tension.

5. In a target trap the combination of a throw arm; a crank associated with the throw arm; a spring acting on the crank for exerting driving pressure on the arm during the throwing movement; and an auxiliary pull actuated spring, acting on the arm and against said first spring after the crank passes the center for driving the arm with a continuous movement in continuation of the throwing movement to a position putting said first spring under approximately maximum tension.

6. In a target trap the combination of a throw arm; a crank associated with the throw arm; a spring acting on the crank for exerting driving pressure on the arm during its throwing movement; and means acting with said spring during the throwing movement and against said spring after said crank passes the center for returning the throw arm.

7. In a target trap the combination of a throw arm; a crank associated with the throw arm; a spring acting on the crank for exerting driving pressure on the arm during its throwing movement; and means acting with said spring during the throwing movement and against said spring after said crank passes the center for returning the throw arm with a continuous movement in continuation of the throwing movement.

8. In a target trap the combination of a throw arm; a crank associated with the throw arm; a main spring acting on the crank for exerting driving pressure on the arm during its throwing movement; and an auxiliary spring acting with said main spring during the throwing movement and against said main spring after the crank passes the center for returning the throw arm.

9. In a target trap the combination of a throw arm; a crank associated with the throw arm; a spring acting on the crank for exerting driving pressure on the arm during its throwing movement; and pull operated means acting with said spring during the throwing movement and against said spring after said crank passes the center for returning the throw arm.

10. In a target trap the combination of a throw arm; a crank associated with the throw arm; a main spring acting on the crank for exerting driving pressure on the arm during its throwing movement; and an auxiliary pull operated spring acting with said main spring during the throwing movement and against said main spring after the crank passes the center for returning the throw arm.

11. In a target trap the combination of a throw arm; a crank associated with the throw arm; a main spring acting on the crank for exerting driving pressure on the arm during its throwing movement; a torsion spring acting on the arm and exerting pressure in the direction of its throwing movement; and means for winding the torsion spring with each operation of the trap.

12. In a target trap the combination of a throw arm; a crank associated with the throw arm; a main spring acting on the crank for exerting driving pressure on the arm during its throwing movement; a torsion spring acting on the arm and exerting pressure in the direction of its throwing movement; and pull operated means for winding the torsion spring with each operation of the trap.

13. In a target trap the combination of a throw arm; a shaft on which said throw arm is mounted; a crank actuating said shaft; a main spring operating on the crank; a torsion spring on said shaft and exerting pressure in the direction of the throwing movement; and means for winding the torsion spring.

14. In a target trap the combination of the throw arm; the shaft on which the throw arm is mounted; a crank actuating the shaft; a main spring acting on the crank; and a torsion spring on the shaft arranged to act with the main spring during the throwing movement and against said spring after the crank passes the center.

15. In a target trap the combination of the throw arm; the shaft on which the throw arm is mounted; a crank actuating the shaft; a main spring acting on the crank; a torsion spring on the shaft arranged to act with the main spring during the throwing movement and against said spring after the crank passes the center; and means for winding said torsion spring.

16. In a target trap the combination of the throw arm; a shaft on which said arm is mounted; an actuating crank; a main spring operating upon the crank; a ratchet plate on the shaft; a ratchet mechanism for engaging said plate; a spring secured to said ratchet plate and shaft; and means for turning the ratchet plate.

17. In a target trap the combination of the throw arm; a shaft on which said arm is mounted; an actuating crank; a main spring operating upon the crank; a ratchet plate on the shaft; a ratchet mechanism for engaging said plate; a spring secured to said ratchet plate and shaft; a ratchet wheel mounted on the shaft; a ratchet mechanism between said wheel and ratchet plate; and means for turning the ratchet wheel.

18. In a target trap the combination of the throw arm; a shaft on which said arm is mounted; an actuating crank; a main spring operating upon the crank; a ratchet plate on the shaft; a ratchet mechanism for engaging said plate; a spring secured to said ratchet plate and shaft; a ratchet wheel mounted on the shaft; a ratchet mechanism between said wheel and ratchet plate; means for turning the ratchet wheel; and a spring for returning the ratchet wheel.

19. In a target trap the combination of the throw arm; a shaft on which said arm is mounted; an actuating crank; a main spring operating upon the crank; a ratchet plate on the shaft; a ratchet mechanism for engaging said plate; a spring secured to said ratchet plate and shaft; means for turning the ratchet plate; a ratchet wheel carrying a gear mounted on said shaft; a ratchet mechanism between said wheel and ratchet plate; and a rack operating upon said gear for oscillating said ratchet wheel.

20. In a target trap the combination of the throw arm; a shaft on which said arm is mounted; an actuating crank; a main spring operating upon the crank; a ratchet plate on the shaft; a ratchet mechanism for engaging said plate; a spring secured to said ratchet plate and shaft; means for turning the ratchet plate comprising a ratchet wheel carrying a gear mounted on said shaft; a ratchet mechanism between said wheel and ratchet plate; a rack operating upon said gear for oscillating said ratchet wheel; and a spring for returning the ratchet wheel and rack after an operation.

21. In a target trap the combination of the throw arm 19; the shaft 18 on which the throw arm is mounted; a crank at the opposite end of the shaft from the throw arm; a main spring operating upon the crank; a torsion spring 33 mounted on the shaft; means for adjusting the torsion spring; a ratchet plate 38 to which the spring is secured; a ratchet mechanism for locking the plate; a ratchet wheel mounted on the shaft; a ratchet mechanism between the wheel and the plate; and means for turning the ratchet wheel.

22. In a target trap the combination of the throw arm 19; the shaft 18 on which the throw arm is mounted; a crank at the opposite end of the shaft from the throw arm; a main spring operating upon the crank; a torsion spring 33 mounted on the shaft; means for adjusting the torsion spring; a ratchet plate 38 to which the spring is secured; a ratchet mechanism for locking the plate; a ratchet wheel mounted on the shaft; a ratchet mechanism between the wheel and the plate; a gear on the ratchet wheel; and a rack slidingly mounted in a position to engage the gear.

23. In a target trap the combination of the throw arm; a frame on which said throw arm is rotatively mounted; a crank associated with the throw arm; a spring acting on the crank for exerting driving action on the arm during its throwing movement; means acting on the arm and against the spring after the crank passes the center driving the arm with a continuous movement in continuation of the throwing movement to a set position; a latch against which the arm is set; and an oscillating arm carrying the latch, one end of the arm being arranged in the path of said means.

24. In a target trap the combination of the throw arm; a shaft on which the throw arm is mounted; a plate mounted on the shaft; a cam on the plate; pull actuated means for turning the plate; a latch against which the arm rests; and a pivotally mounted rocking arm disconnected from the cam and carrying the latch and extending into the path of said cam.

25. In a target trap the combination of the throw-arm; the crank associated with the throw arm; a spring acting on the crank for exerting throwing pressure on the throw arm during its throwing movement; means acting with the spring during its throwing movement and against said spring after the crank passes the center for returning the throw arm; a latch; and means actuated by said first named means for actuating said latch.

26. In a target trap the combination of the throw arm; a crank associated with the throw arm; a main spring operating on the crank; a torsion spring acting on the throw arm; means for winding the torsion spring; a latch; and means actuated by said first named means for operating the latch.

27. In a target trap the combination of the throw arm; a crank associated with the throw arm; a main spring operating on the crank; a torsion spring operating with the main spring during the throwing action and against the main spring after the crank passes the center; means for winding the torsion spring; a latch against which the throw arm is brought to rest; and mechanism acting with said means for tripping the latch, the torsion spring and main spring being so proportioned as to require some winding of the torsion spring after the tripping of the latch to return the throw arm.

28. In a target trap the combination of the throw arm; the carrier arranged thereon having a fixed and a movable jaw; a post on the movable jaw; a bell crank lever pivoted on the fixed jaw; a catch on the bell crank lever adapted to engage and catch the post; a spring acting on said post and said bell crank lever; and means on the bell crank lever in position to be engaged by the target as it is inserted in the carrier.

29. In a target trap the combination of the throw arm; the carrier arranged thereon having a fixed and movable jaw; a post on the movable jaw; a bell crank lever pivoted on the fixed jaw; a cam surface on the bell crank lever forming a catch for engaging the post, the cam surface being fashioned to follow the surface of the post as the bell crank lever is swung into engaging position.

30. In a target trap the combination of the throw arm; a carrier mounted on the throw arm, the carrier formed with a fixed and pivoted jaw; the post 93 on the pivoted jaw extending through a slot in the fixed jaw; the bell crank lever 97 pivoted on the fixed jaw; the post 96 on the bell crank lever; the rod 95 extending from the post 93 by the post 96; a spring 98 tensioned against the post 96 and the rod; the catch surface 101 on the bell crank lever in position to engage the post 93; and the finger 102 extending forwardly from the end of the bell crank lever in position to be engaged by a target as it is inserted.

31. In a target trap the combination of the throw arm; a carrier on the arm and a cam mechanism coöperating with the arm and the carrier for positioning the carrier after the operation of the trap.

32. In a target trap the combination of the throw arm; a cam on the arm; a carrier pivotally mounted on the throw arm; a part moving with the carrier and coöperating with said cam for positioning the carrier after the operation of the trap.

33. In a target trap the combination of the throw arm; a cam on the arm; a carrier pivotally mounted on the throw arm; and a spring actuated part moving with the carrier and coöperating with said cam for positioning the carrier after the operation of the trap.

34. In a target trap the combination of the throw arm; a carrier pivotally mounted on the throw arm; a cam on one of said members; and a spring actuated part moving with the other and acting on said cam to position the carrier after the operation of the trap.

35. In a target trap the combination with the throw arm; a carrier pivotally mounted on the throw arm; a cam on one of said members; and a spring actuated part moving with the other and acting on said cam to position the carrier after the operation of the trap, said part being arranged to permit the free swinging of the carrier toward the rear.

36. In a target trap the combination of the throw arm; a carrier pivotally mounted on the throw arm; a cam on one of said members; a spring actuated part moving with the other and acting on said cam to position the carrier after the operation of the trap, said part being arranged to permit the free swinging of the carrier toward the rear; and the spring acting on said part and as a tensioning device for the carrier.

37. In a target trap the combination of the throw arm; a carrier pivotally mounted thereon; a spring for tensioning the pivot of the carrier by exerting pressure in an axial direction on the pivot; and means acting with and actuated by the energy of said spring for positioning the carrier.

38. In a target trap the combination of the throw arm; the carrier; the pin extending through the carrier and the arm pivotally securing the carrier to the arm; a spring on said pin; a cam on the arm; a second pin secured to said pivot pin and extending therefrom in position to engage the cam; and means for locking the second pin to swing with the carrier.

39. In a target trap the combination of the throw arm; a carrier; a pin extending through the carrier and arm for pivotally securing the carrier to the arm; a spring on said pin; a cam on the arm; a second pin secured to the pivot pin for operating on said cam; and a slotted plate secured to the carrier; the slot engaging said second pin for locking the pin to swing with the carrier.

40. In a target trap the combination of the throw arm having a cam 84 on the end thereof; a carrier; the pin 81 extending through the carrier and arm; a spring 82 arranged on the pin forming a tension device for the carrier; a second pin 83 extending from the pin 81 and positioned to act on the cam 84; and means for locking the pin 83 with the carrier.

41. In a target trap the combination of the throw arm having a cam 84 on the end thereof; a carrier; the pin 81 extending through the carrier and arm; a spring 82 arranged on the pin forming a tension device for the carrier; a second pin 83 extending from the pin 81 and positioned to act on the cam 84; the slotted plate 86 secured to the carrier and engaging said pin for moving said second pin with the carrier.

42. In a target trap the combination of the throw arm arranged to make a complete circle with each operation; a carrier pivotally mounted on the arm; a cam arranged on one of said members; a device carried by the other of said members in position to be actuated by said cam as the carrier swings forward of the arm for positioning the carrier.

43. In a target trap the combination of the throw arm arranged to make a complete circle with each operation; a carrier pivotally mounted on the arm; a cam arranged on one of said members; a device carried by the other of said members in position to be actuated by said cam as the carrier swings forward of the arm for positioning the carrier, said part being arranged to permit the free swinging of the carrier back of the arm.

44. In a target trap the combination of an oscillating frame; a rotating member; a lock for the frame; means for oscillating the frame; and devices controlled by the rotative member for tripping the lock.

45. In a target trap the combination of an oscillating frame; a rotating member; a chance wheel; a lock for the frame; means for oscillating the frame; and devices controlled by the chance wheel for tripping the lock.

46. In a target trap the combination of an oscillating frame; a rotating member; a lock for the frame; means for oscillating the frame comprising a yielding driving connection; and devices controlled by the rotating member for tripping the lock.

47. In a target trap the combination of an oscillating frame; a chance wheel; a lock for the frame; means for oscillating the frame comprising a yielding driving connection; and devices controlled by the chance wheel for tripping the lock.

48. In a target trap the combination of an oscillating frame; a rotative driving means for oscillating said frame; a spring for actuating said means; and devices for winding said spring.

49. In a target trap the combination of an oscillating frame; a rotative driving means for oscillating said frame; a spring for actuating said means; and pull actuated devices for winding said spring.

50. In a target trap the combination of an oscillating frame; a rotating member; means comprising a crank and link connection to the frame; a spring for actuating said means; and devices for winding the spring.

51. In a target trap the combination of an oscillating frame; a rotating driving means for the frame; a spring for actuating said means; devices for winding said spring; and a lock for securing the frame in its adjusted positions.

52. In a target trap the combination of an oscillating frame; a rotating driving means for the frame; a spring for actuating said means; devices for winding said spring; a lock for securing the frame in its adjusted positions; and means actuated by the pull for actuating the lock.

53. In a target trap the combination of an oscillating frame; a rotating driving means on the frame; a spring for actuating said means; devices for winding said spring; a lock for securing the frame in its adjusted positions; and means comprising a chance device for actuating said lock.

54. In a target trap the combination of an oscillating frame; a rotating driving means on the frame; a spring for actuating said means; devices for winding said spring; a lock for securing the frame in its adjusted positions; and means comprising a chance wheel for actuating said lock.

55. In a target trap the combination of an oscillating frame; a crank; a link connecting the crank with the oscillating frame; pull actuated means for driving the crank; and a lock actuated by the pull for locking the frame in its adjusted position.

56. In a target trap the combination of an oscillating adjustable frame; a crank; a link connecting the crank with the frame; a reciprocating means; a connection between the means and the crank comprising a spring for communicating the movement of the means to the crank; and a lock for locking the frame in adjusted positions; and means actuated by the means for actuating said lock.

57. In a target trap the combination of an oscillating frame; a crank; a link connection between the crank and the frame; a throwing mechanism; a pull mechanism for actuating said throwing mechanism when moved in one direction; and devices actuated by the pull when moved in the opposite direction for driving said crank.

58. In a target trap the combination of an oscillating frame; a pull mechanism, a chance wheel set in motion thereby; a lock; devices actuated by the chance wheel for tripping the lock, said chance wheel being arranged to move under its inertia after the tripping of the lock.

59. In a target trap the combination of an oscillating frame; a crank; a link connecting the frame with the crank; a chance wheel; a pull mechanism; devices actuated by the pull mechanism for driving the crank and rotating the chance wheel; and devices controlled by the chance wheel for determining the position of the oscillating frame.

60. In a target trap the combination of an oscillating frame; a driving mechanism therefor; a lock for locking the frame; a chance mechanism moving with said driving mechanism until the tripping of the lock and free to move after the tripping of the lock, said chance wheel determining the movement of the frame.

61. In a target trap the combination of an oscillating frame; a crank; a connection between the crank and the frame; a pull mechanism; a driving connection between the pull mechanism and crank; a lock for locking the frame in adjusted position; a chance wheel moving with the crank prior to the tripping of the lock and free to move after the tripping of the lock, said chance wheel controlling the tripping of the lock.

62. In a target trap the combination of an oscillating frame; a crank; a connection between the crank and the frame; a pull mechanism; a driving connection between the pull mechanism and crank; a lock for locking the frame in adjusted position; a chance wheel moving with the crank prior to the tripping of the lock and free to move after the tripping of the lock, said chance wheel controlling the tripping of the lock; and means for preventing the over running of the chance wheel prior to the tripping of the lock.

63. In a target trap the combination of an oscillating frame; a driving means therefor; a chance wheel; a pull mechanism operating the driving mechanism and the chance wheel; a lock for locking the frame; and devices controlled by the chance wheel for tripping the lock.

64. In a target trap the combination of an oscillating frame; a crank; a chance wheel driven with the crank; a lock; devices controlled by the chance wheel for tripping the lock; a connection between the crank and the oscillating frame; and means for driving the crank and chance wheel.

65. In a target trap the combination of an oscillating frame; a lock therefor; a chance wheel; means for moving the frame and actuating the chance wheel; and devices actuated by the chance wheel for tripping the lock, said chance wheel being free to rotate after the tripping of the lock.

66. In a target trap the combination of an oscillating frame; a driving mechanism therefor; a chance wheel driven with said driving mechanism; a lock for the frame; devices actuated by the chance wheel for tripping the lock; means for preventing the over running of the chance wheel in relation to the driving means prior to the tripping of the lock; and devices for throwing out said means after the tripping of the lock to permit of the free running of the chance wheel.

67. In a target trap the combination of an oscillating frame; a rotating drive therefor comprising a ratchet wheel and gear, and a rack for operating the gear; and ratchet devices for actuating the driving mechanism.

68. In a target trap the combination of an oscillating frame; a rotating drive therefor comprising a ratchet wheel and gear; a rack for operating the gear; ratchet devices for actuating the driving mechanism; and a yielding connection between the gear and the oscillating frame to permit of a more rapid movement of the rack than of the oscillating frame.

69. In a target trap the combination of an oscillating frame; a rotative driving member therefor; a rack and gear device for driving the rotative member; a lock for locking the frame; and means on the rack for actuating the lock.

70. In a target trap the combination of an oscillating frame, a rotative driving member therefor; a rack and gear device for driving said rotative member; a lock for locking the frame; means on the rack for actuating the lock; a chance wheel put in motion by said driving mechanism; and devices controlled by the chance wheel for tripping the lock.

71. In a target trap the combination of an oscillating frame; a rotative driving means therefor comprising the shaft 109; a gear on the shaft; a ratchet plate with a pawl operating upon the gear; and a spring having one end secured to the ratchet plate and the other to the shaft and the rack operating upon the gear.

72. In a target trap the combination of an oscillating frame; a rotative drive therefor; a lock operating on the drive for locking the frame, comprising a slide and a notched wheel; a reciprocating member connected with the pull having a cam thereon; and devices connected with the slide arranged in the path of the cam for actuating the slide as the cam is reciprocated.

73. In a target trap the combination of an oscillating frame; a rotative driving means therefor comprising the shaft 109; a gear on the shaft; a ratchet plate with a pawl operating upon the gear; a spring having one end secured to the ratchet plate and the other to the shaft; the rack operating upon the gear; a lock on the frame comprising a notched wheel; a slide; and a cam on the rack for actuating the slide.

74. In a target trap the combination of an oscillating frame; a rotative driving member therefor comprising a shaft; a chance wheel on the shaft; a notched wheel fixed on the shaft; a locking device operating on the notched wheel; a trip lever for holding the lock out of locking position on the notched wheel; and devices actuated by the chance wheel for actuating said trip.

75. In a target trap the combination of an oscillating frame; a rotative driving member therefor comprising a shaft; a chance wheel on the shaft; a locking dog; a bell crank lever having a trip for engaging said dog and holding it out of locking position; and devices actuated by the chance wheel for operating upon said bell crank lever to trip the lock.

76. In a target trap the combination of an oscillating frame; a rotative driving member therefor comprising a shaft; a chance wheel on the shaft; a locking dog; a bell crank lever having a trip for engaging said dog and holding it out of locking position; devices actuated by the chance wheel for operating upon said bell crank lever to trip the lock; a reciprocating pull mechanism; and devices actuated by the pull mechanism for throwing said dog out of locking position.

77. In a target trap the combination of an oscillating frame; a relative driving member comprising a notched wheel; a chance wheel arranged concentric with the notched wheel and arranged to be driven by the driving mechanism; a ratchet connection between the ratchet wheel and notched wheel; a second ratchet device opposed to the first to prevent the over running of the chance wheel; a locking dog for the notched wheel; a trip for the dog controlled by the chance wheel; a trip actuated device for throwing out said over running ratchet mechanism when the lock is thrown into the notched wheel.

78. In a target trap the combination of an oscillating frame; a throw arm thereon; a latch; a pull mechanism for operating the throw arm and the latch; a driving mechanism for said frame, said frame being actuated by the pull mechanism; and a lock actuated by the pull mechanism for locking the frame in its adjusted position.

79. In a target trap the combination of a throw arm; an oscillating frame on which the throw arm is mounted; a torsion spring for actuating the throw arm; a driving means on the oscillating frame comprising a torsion spring; means for winding one of said torsion springs on one stroke of the pull mechanism and the other of said springs on the reverse stroke of the pull mechanism; and said pull mechanism.

80. In a target trap the combination of an oscillating frame; a throw arm thereon; a latch; a pull mechanism for operating the throw arm and the latch; a driving mechanism for said frame, said frame being actuated by the pull mechanism; a lock actuated by the pull mechanism for locking the frame in its adjusted position; and a chance wheel operating with the driving mechanism and controlling the tripping of the lock.

81. In a target trap the combination of an oscillating frame; a rotating member; a lock for the frame; pull operated means for actuating the frame; and devices controlled by the rotating member for tripping the lock.

82. In a target trap the combination of an oscillating frame; a rotating member; a lock for the frame; pull operated means for actuating the frame comprising a yielding driving connection; and devices controlled by the rotative member for tripping the lock.

83. In a target trap the combination of an oscillating frame; a crank; a connection between the crank and the frame; a driving mechanism on the crank; a pull mechanism for the trap; a connection between the pull mechanism and the crank for actuating the crank; and a lock for locking the frame in adjusted position.

84. In a target trap the combination of an oscillating frame; a crank; a connection between the crank and the frame; a driving mechanism on the crank; a pull mechanism for the trap; a connection between the pull mechanism and the crank for driving the crank comprising a spring for communicating the movement of the pull mechanism to the crank; and a lock for locking the frame in adjusted position.

85. In a target trap the combination of an oscillating frame; a crank for driving the same; a chance wheel for determining the movement of the crank; a pull mechanism; and a connection between the pull mechanism and crank and chance wheel for actuating the same as the pull mechanism is actuated.

86. In a target trap the combination of an oscillating frame; a lock therefor; a pull mechanism; devices actuated by the pull mechanism for actuating the lock; a connection between the pull mechanism and the frame for driving the same; and devices controlled by the chance wheel for tripping the lock.

87. In a target trap the combination of an oscillating frame; a lock for the frame; and a spring buffer for absorbing the shock when the lock is thrown in.

88. In a target trap the combination of an oscillating frame; a rotating driving member; and a link connection between the driving member and the frame comprising a spring link adapted to yield in both directions.

89. In a target trap the combination of an oscillating frame; a rotating driving member; and a link connection between the driving member and the frame comprising a link formed of two over lapping parts with an interposed spring adapted to yield with the relative movement of said parts in either direction.

90. In a target trap the combination of an oscillating frame; a rotating driving member; a link connection between the driving member and the frame comprising the two over lapping half round pieces; a spring on the same; and abutments on the half round pieces for both ends of the spring.

91. A spring buffer comprising over lapping pieces; a surrounding spring; and abutments on both pieces at both ends of the spring whereby the movement of the over lapping pieces in either direction compresses the spring, the engagement of the abutments with the spring being short circumferentially to effect the cocking of the spring and the binding of the over lapping pieces.

92. In a target trap the combination of an oscillating frame; a lock for locking the frame in adjusted position; and the spring buffer arranged to absorb the shock incident to the inertia of the frame at the end of the stroke and the shock incident to the locking of the frame.

93. In a target trap the combination of the base; a guide rod 71 secured to the base; a stop 71$^b$ on the rod; the rack 74 having the cross pieces 69 and 74$^a$ thereon sliding on the rod 71; the pull rod 72 secured to said cross pieces; and devices for operating the trap secured to the cross piece 69.

94. In a target trap the combination of an oscillatory frame; a pull mechanism; a spring put under tension through the action of the pull mechanism; and appliances acting under the influence of the spring for varying the position of the frame to vary the flight of the target.

95. In a target trap the combination of an oscillatory frame; a pull mechanism; a yielding connection between the frame and the pull mechanism whereby the pull mechanism may be brought to rest and the movement of the frame completed through the yielding connection after the pull mechanism is brought to rest.

96. In a target trap, the combination of a throw arm; a carrier pivotally mounted thereon and having a fixed and a movable jaw; means mounted on the carrier for automatically locking the jaws in open position after the target is thrown; and a device on said means located in a line extending from the carrier pivot outwardly centrally between the jaws for actuating said means to release and permit the closing of the jaws, said devices being in position to be engaged by the target as it is inserted in the carrier.

97. In a target trap, the combination of a throw arm; a carrier arranged thereon having a fixed and a movable jaw; a catch for locking the jaws in an open position; and means on the catch in a line extending from the pivot of the carrier outwardly centrally between the jaws in position to be engaged by the target as it is inserted in the carrier for tripping the catch.

98. In a target trap, the combination of a throw arm; a carrier arranged thereon having a fixed and movable jaw; a catch for locking said jaws in an open position; a bell crank lever carrying said catch; and a spring operating upon the bell crank lever and the movable jaw for throwing the catch into position to lock the jaws in open position, and for exerting pressure on the movable jaw to hold it in closed position.

In testimony whereof I have hereunto set my hand in the presence of two subscribing witnesses.

HUGH C. LORD.

Witnesses:
J. R. CRAIG,
B. F. PARKER.